US006424290B1

(12) United States Patent
O'Neil et al.

(10) Patent No.: US 6,424,290 B1
(45) Date of Patent: Jul. 23, 2002

(54) NARROWBAND PASSIVE DIFFERENTIAL TRACKING SYSTEM (U)

(75) Inventors: Gary E. O'Neil, Boca Raton, FL (US); Richard A. Lodwig, Woodbine, MD (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 07/456,820

(22) Filed: Dec. 13, 1989

(51) Int. Cl.[7] .................................... G01S 13/00

(52) U.S. Cl. .......................... 342/55; 342/463; 342/464

(58) Field of Search .......................... 342/55, 464, 463, 342/453

(56) References Cited

U.S. PATENT DOCUMENTS 2,940,076 A 6/1960 Bissett et al. ............... 342/451
2,968,034 A 1/1961 Cafarelli, Jr. ............... 342/451
2,971,190 A * 2/1961 Busignies ................... 342/463
2,972,742 A 2/1961 Ross .......................... 342/451
3,182,328 A * 5/1965 Hings ..................... 342/453 X
3,242,487 A 3/1966 Hammack ............... 342/453 X
3,270,340 A 8/1966 Hammack ................... 342/103
3,286,263 A 11/1966 Hammack ................... 342/463
3,487,462 A 12/1969 Holberg ....................... 342/59
3,706,096 A 12/1972 Hammack ............... 342/451 X
3,812,493 A 5/1974 Afendykiw et al. .... 342/453 X
3,863,257 A 1/1975 Kang et al. ................. 342/458
3,987,445 A * 10/1976 Fales, III .................... 342/453
4,054,880 A * 10/1977 Dalabakis et al. .......... 342/464
4,246,580 A 1/1981 Caputi, Jr. ................... 342/25
4,281,327 A 7/1981 Frazier et al. .......... 342/451 X
4,325,065 A 4/1982 Caputi, Jr. ................... 342/25
4,350,984 A 9/1982 Fisher ........................ 342/451
4,370,656 A 1/1983 Frazier et al. ............. 342/458
4,442,432 A 4/1984 Quigley .................. 342/451 X
4,477,812 A 10/1984 Frisbee, Jr. et al. ......... 342/417

* cited by examiner

*Primary Examiner*—Theodore M. Blum
(74) *Attorney, Agent, or Firm*—William G. Auton

(57) ABSTRACT

The tracking of moving vehicles over long distances without emitting illumination signals is accomplished with a narrowband passive differential tracking system. Instead of Providing especially designed radar transmitters in a bistatic radar system, illuminators of opportunity (which may include UHF and VHF television station) are selected by their geographic locations so that they are in proximity to a moving target. The Doppler-shifted target reflected signals from the illuminators of opportunity are converted into digital data and combined with the independently derived initial target location and used to update the target's position and velocity by correlating the Doppler-shift with geographic coordinates. The correlation can be accomplished with a tracking algorithm which was designed for use in data processing of the signal processing system of the narrowband passive position tracking system.

5 Claims, 4 Drawing Sheets

190
160
150
140
100
110
120
130

LEGEND GEOGRAPHIC COORDINATE SYSTEM

NARROWBAND PASSIVE DIFFERENTIAL TRACKING SYSTEM (U)

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to bistatic passive differential tracking systems, which is not radar, and specifically, to a process for passively tracking moving vehicles over long distances once their initial position has been established without emitting illumination signals based upon bistatic doppler only target echo return signals engendered by illuminators of opportunity.

The determination of the location of a passive target aircraft can be done with RADAR, which uses a dedicated transmitted waveform from one or more transmitting stations. RADAR requires an active transmission of a specific signal. Alternately, the determination of the location of a passive target aircraft can be done by passive coherent location (PCL) methods, where there is no specific transmission of an electromagnetic waveform required. This has the advantage of being covert, jam-proof, survivable, low cost and reliable. The invention herein is based on PCL methods and is not RADAR.

The term "location", as used herein, means the identification of a previously unknown locus. The term "tracking", as used herein, is the activity of following the: motion of a target whose location was previously known. The invention herein deals with tracking only, and requires a prior knowledge of the target's location. The term "passive differential tracking" is the term used to describe the action of the invention herein, which is the measurement of time-sequential displacement of the instantaneous position of a target with respect to a previously known, independently derived target location. In a bistatic passive tracking system, the illuminating transmitters and receiver are located at different locations.

When used in military applications, monostatic or bistatic radar has the disadvantage that the transmitter cab be detected at long range (hundreds of miles) by the electromagnetic pulses it emits. This allows the enemy to detect the presence of a radar system and also to determine its location. To get around this disadvantage, Passive Coherent Locations (PCL) was developed. PCL does not have a transmitter, but rather has a receiver system that utilizes the radiating emitted by separately located illuminators of opportunity in its reception area. In contrast the transmitter of a radar system which is being used by a monostatic or bistatic radar receive station is specific in waveform, frequency and other parameters.

The task of providing a bistatic radar receiver is alleviated, to some degree by the prior art techniques disclosed in the following U.S. Patents;

U.S. Pat. No. 3,487,462 issued to Holmberg;

U.S. Pat. No. 3,812,493 issued to Afendykiw et al;

U.S. Pat. No. 4,246,580 issued to Caputi Jr.;

U.S. Pat. No. 4,325,065 issued to Caputi, Jr.; and

U.S. Pat. No. 4,370,656 issued to Frazier et al.

All of the patents listed above, disclose bistatic synthetic aperture radar systems, and are incorporated herein by reference. Both of the Caputi patents, as well as that of Frazier et al, disclose Airborne bistatic radar systems entailing a first aircraft possessing a long range radar transmitter, and a second aircraft with a receiver. The distance between the two aircraft,is determined when the second aircraft receives direct path signals, which are received directly from the transmitter on the first aircraft.

The task of tracking targets with a passive bistatic radar tracking system is alleviated by the prior art techniques of the following U.S. Patents, which are incorporated herein by reference:

U.S. Pat. No. 2,940,076 issued to Bissett on Jun. 7, 1960;

U.S. Pat. No. 2,968,034 issued to Cafarelli on Jan. 10, 1961;

U.S. Pat. No. 2,972,742 issued to Ross on Feb. 21, 1961;

U.S. Pat. No. 3,863,257 issued to Kang on Jan. 28, 1965;

U.S. Pat. No. 4,281,327 issued to Frazier on Jul. 28, 1981;

U.S. Pat. No. 4,350,984 issued to Fisher on Sep. 21, 1982;

U.S. Pat. No. 4,442,4,32 issued to Quigley on Apr. 10, 1984; and

U.S. Pat. No. 4,477,812 issued to Frisbee on Oct. 16, 1984.

The designs of most prior art bistatic radar systems entail a building of one or more cooperative radar transmitters to serve as illuminators for an especially designed radar receiver. The narrowband passive differential tracking system of the present invention utilizes a receiving system which uses non-cooperative transmitters of opportunity as independent illumination sources and tracks the target with a tracking algorithm which updates the target's state with respect to a independently known initial position using Doppler-shifted signals reflected from a target.

SUMMARY OF THE INVENTION

The process of the present invention is an algorithm which can provide differential tracking of targets based upon a known initial position of the target and the bistatic Doppler target return information. The procedure requires the knowledge of the position of two illuminators or transmitters and the known target initial position. When a target passes through a region illuminated by the transmitters, the present invention can continuously update the target's new location, based on average speed, course and distance traveled computed from the Doppler shifted target reflected signal history, if the invention is initially given the position coordinates of both illuminators, the receiver and the initial target location.

The process begins by the selection of two illuminators of opportunity, which are two independent electromagnetic signal transmitters which serve as transmitters of uncooperative and independent signals. In the embodiment which was tested, the two illuminators of opportunity were the narrowband video carrier of two television stations: channel 15 of Lancaster, Pa., and channel 16 of Salisbury, Md.

Since most illuminators of opportunity are stationary radio frequency radio frequency (RF) signal sources, their latitudes and longitudes are well established and available.

Similarly, the latitude and longitude of the PCL receiver is established. Next, the PCL receiver is monitored until a target vehicle reflects signals to the receiver. At this point, this known initial target position and the subject algorithm are used to establish the change in the target's state (its position and velocity). This involves using the given latitude and longitude of the two illuminators, the receiver and the target. The present invention uses an interactive narrowband passive coherent location (PCL) two-Doppler tracking program, which continuously accepts new Doppler data as an input for updating the target's state (position and velocity).

The two-Doppler tracking program of the present invention is an algorithm written in BASIC. This algorithm converts all latitude and longitude values to an x-y grid and correlates the Doppler shifted signals from the two illuminators to an expression of distance in wavelengths which, in turn, can be expressed in more convenient units such as nautical miles. The target position is then updated and reconverted into latitude and longitude, while the change in distance of target location over the time interval provides the vehicle ground speed.

It is a principal object of the present invention to provide a narrowband passive differential tracking system which uses independent sources of electromagnetic emission as illuminators.

It is another object of the present invention to provide a target tracking algorithm which continuously updates a target's state using Doppler-shifted target echo return signals.

These objects together with other objects, features advantages of the invention will become more readily apparent from the following detailed description when taken in conjunction with the accompanying drawing wherein like elements are given like reference numerals throughout.

DETAILED DESCRIPTION OF THE PREFERRED EMBODIMENT

The present invention is a narrowband passive position tracking system for differential position tracking of moving vehicles over long distances without emitting illumination signals. Continuous target tracking is accomplished using Doppler-shifted target echo return signals engendered by illuminators of opportunity.

Figure 1:
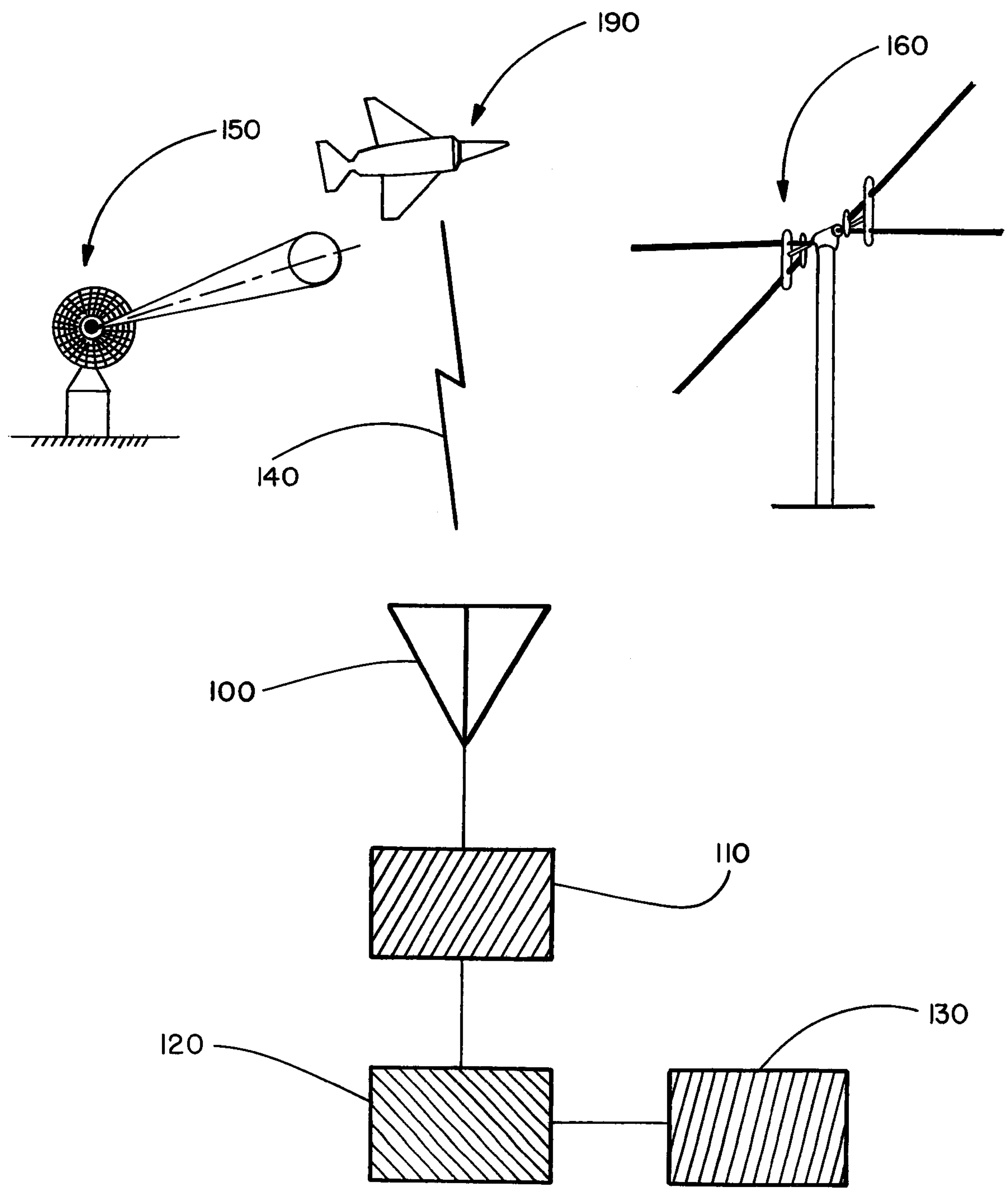
FIG. 1 is a schematic of the passive radar system of the present invention.

The reader's attention is now directed towards FIG. 1, which is a schematic of the passive system of the present invention. This passive system includes a receiving antenna 100, at least one receiver 110, a signal processing system 120, and a display 130; all of which work in combination with two illuminators of opportunity 150 and 160 to track a target 190.

In the present invention the illuminators of opportunity 150 and 160 are not limited to radar transmitters which have been designed to act cooperatively with a co-designed bistatic radar receiver. These illuminators of opportunity include selected independent electromagnetic signal transmitters (such as television station transmitters) which act as uncooperative RF signal sources are used in the present invention to to track a target's state (position and velocity).

Figure 2:
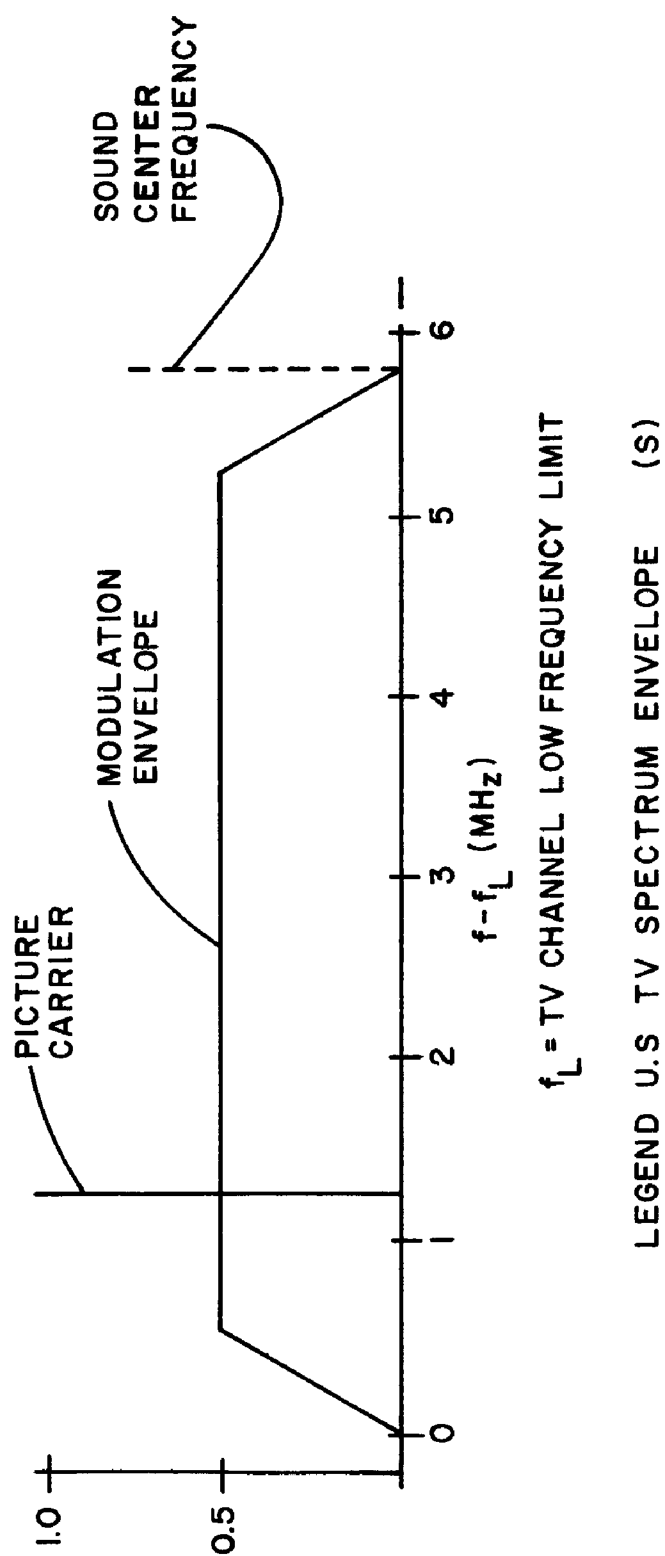
FIG. 2 is a chart of a United States TV spectrum envelope.
Figure 3:
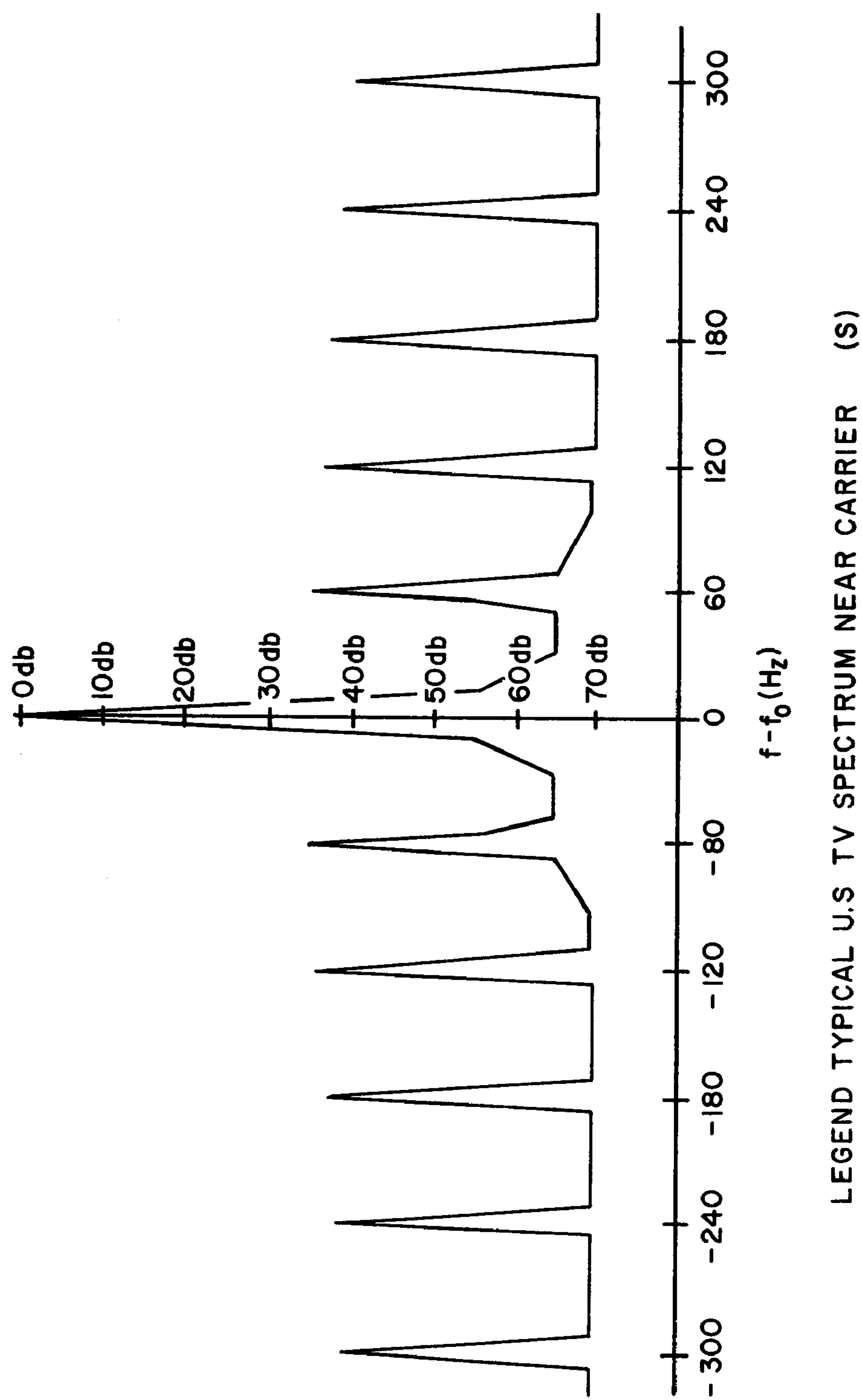
FIG. 3 is a chart of a typical United States TV spectrum near the carrier.

If television station's transmitters are used as the illuminators of opportunity, the following needs to be considered. The TV picture carrier is typically less than 1 Hz in bandwidth, picture carrier for a US TV signal is shown in FIG. 2.

The part of the TV spectrum of interest to passive coherent local (PCL) is that near the carrier. FIG. 2 shows a typical US TV spectrum near the video carrier. This spectrum is dominated by the carrier and the spectral lines which occur at multiples of 60 Hz away from it. The video picture data is contained in the energy that occurs between the lines. However, the picture data spectrum level is generally quite low. That is $A(w)/A(0)^2 \leqq 10^{-7}$ for $w \neq 2\pi$ N60. The only exception to this occurs when the scene in the TV picture changes. Then, the gap between the lines fill in somewhat.

TV transmitters operate at predefined frequencies in the VHF and UHF frequency bands. To some extent, the frequencies allocated to each TV channel vary from country to country. However, most of the transmitters currently in use operate in one of 3 frequency ranges. They are 50–90 MHz (channels 2–6), 164–230 MHz (channels 7–13), and 470–890 (channels 14–83).

Generally, a guideline to the sources and frequencies of United States illuminators is as depicted below in Table 1. These illuminators are generally available 100% of the time, although, the user of the present invention would be presumed to know the operating hours (as well as the latitudes and longitudes) of stations before selecting them as illuminators of opportunity.

TABLE 1

Sources and Frequencies of U.S. Illuminators

| Sources | Narrowband |
|---|---|
| UHF TV (Video) | 470–906 MHZ |
| Low VHF TV (Video) | 54–88 MHZ |
| High VHF TV (Video) | 174–216 MHZ |

The Transmitter parameters of illuminators of interest those presented in Table 1 are summarized Table 2.

TABLE 2

Transmitter Parameters

1) Video Carrier ERP ($P_T G_T$)

| Typical | Maximum | Frequency Band |
|---|---|---|
| 100 kW | 100 kW | 50–90 MHz |
| 200 kW | 316 kW | 164–230 MHz |
| 500 kW | 5000 | 470–890 MHz |

2) Transmitter Antenna Azimuth Beamwidth-Generally 360°

3) Polarization-Generally Horizontal

The radio receiver antenna 100 of FIG. 1 is, therefore, designed to receive signals engendered in response to target signals which are reflections of one of the illuminator picture carriers with characteristics from Table 1.

The narrowband passive position tracking system of the present invention is designed to continuously generate a target's updated location, average speed, course and distance traveled from Doppler-shifted target return signals, when given the latitude of: two illuminators, the receiver, and the initial target location. The process begins by the selection of two illuminators of opportunity In a test of the present invention, the two illuminators selected were: Channel 15 of Lancaster, Pa. and Channel 16 of Salisbury, Md. When the two illuminators are selected their latitudes, longitudes, videocarrier frequencies and maximum delta in their frequencies should be identified for algorithm of the present invention. This algorithm is presented below in the form of Table 3.

The selection of the two illuminators of opportunity might be made based upon their: geographic location, availability (not all stations broadcast continuously over a 24 hour period), frequencies and power output.

TABLE 3

```
1   TWO ILLUMINATOR NARROW-BAND TRACKING PROGRAM
2   This program performs the 2 illuminator narrow-band tracking algorithm
    This program can artificially error the input dopplers in Gaussian fashion
9   ‘ FNDMS and FNDMSI convert points on an x-y grid to lat-long and back again.
10  DEF FNDMS(X)=INT(X)+(INT(X$100+1/120)-INT(X)$100)/60 +
        (X$10000-INT(X$100+1/120)$100)/3600
20  DEF FNDMSI(X)=SGN(X)$(ABS(INT(X))+ABS(INT((X-INT(X))$60+1/70)/10000))
        ABS(INT((X$60-INT (X$60+1/70))$60+1/70)/10000))
21  N=VAL(RIGHT$(TIME$,2))
22  RANDOMIZE N
25  LPRINT CHR$(27)+CHR$(69):LPRINT DATE$:LPRINT
30  INPUT"LOC OF RECEIVER IN LAT,LONG(dd.mmss)";LA(0),LO(0)
40  LPRINT"LOC OF RECEIVER IN LAT,LONG(dd.mmss)"LA(0),LO(0)
50  INPUT"LOC OF ILLUMINATOR 1 IN LAT,LONG(dd.mmss)";LA(1),LO(1)
60  LPRINT"LOC OF ILLUMINATOR 1 IN LAT,LONG(dd.mmss)";LA(1),LO(1)
70  INPUT"LOC OF ILLUMINATOR 2 IN LAT,LONG(dd.mmss)";LA(2),LO(2)
80  LPRINT"LOC OF ILLUMINATOR 2 IN LAT,LONG(dd.mmss)"LA(2),LO(2)
90  INPUT"INPUT CARRIER F AND ASSOCIATED DELTA F FOR ILLU. 1";CAR(1),DOP(1)
100 LPRINT"INPUT CARRIER F AND ASSOCIATED DELTA F FOR ILLU. 1"CAR(1),DOP(1)
110 INPUT"INPUT CARRIER F AND ASSOCIATED DELTA F FOR ILLU. 2";CAR(2),DOP(2)
120 LPRINT"INPUT CARRIER F AND ASSOCIATED DELTA F FOR ILLU. 2"CAR(2),DOP(2)
130 INPUT"INPUT TIME FROM LAST MEASUREMENT (IN SECONDS)";T
140 LPRINT"INPUT TIME FROM LAST MEASUREMENT (IN SECONDS)"T
149 COUNT=0
150 INPUT"INITIAL LOC OF TARGET IN LAT,LONG(dd.mmss)";LA(3),LO(3)
160 LFPRINT"INITIAL LOC OF TARGET IN LAT,LONG(dd.mmss)"LA(3),LO(3)
170 FOR I=1 TO 2
171         XX=0
172         FOR J=1 TO 20;XX=XX+RND:NEXT
173         XX=(XX-10)$.7745967
174         DOP(I)=DOP(I) + DOP(I)$.002$XX
175         PRINT DOP(I)
176         NEXT
177 FOR A=0 TO 3 ‘convert lat-long values to an x-y grid
180         LAA(A)=FNDMS(LA(A))
190         LOO(A)=FNDMS(LO(A))
200         X(A)=60$(LOG(0)-LOO(A))$COS(LAA(0)$3.14159/180)
210         Y(A)=60$(LAA(A)-LAA(0))
220         NEXT
230 FOR A=1 TO 2 ‘calculate range sum difference
240         RSD(A)=-(162000!)$DOP(A)$T/CAR(A)
250         NEXT
260 XG=X(3):YG=Y(3)
270 FOR A=1 TO 2 ‘calculate values af simultaneous equations
280         RR(A)=RDS(A)+SQR((XG-X(0))ˆ2)+(YG-Y(0))ˆ2)+SQR((XG-X(A))ˆ2+(YG-Y(A))ˆ2)
290         RRG(A)=RR(A)-RSD(A)
300         NEXT
310 WHILE SQR((RR(1)-RRG(1))ˆ2+(RR(2)-RRG(2))ˆ2) >.001 ‘window of convergence
320         COUNT=COUNT+1
330         IF COUNT=50 THEN PRINT"DIVERGENCE":GOTO 800
340         FOR A=0 TO 2 ‘calculate values of Jacobian
350                 DRDX(A)=((XG-X(A))ˆ2+(YG-Y(A))<2)ˆ(-.5)$(XG-X(A))
360                 DRDX(A)=((XG-X(A))ˆ2+(YG-Y(A))<2)ˆ(-.5)$(XG-X(A))
370                 NEXT
380         J(1,1)=DRDX(0)+DRDX(1)
390         J(1,2)=DRDV(0)+DRDY(1)
400         J(2,1)=DRDX(0)+DRDX((2)
410         J(2,2)=DRDV(0)+DRDV(2)
420         D=J(1,1)$J(2,2)-J(1,2)$J(2,1) ‘determinant of Jacobian
430         IF D=0 THEN PRINT"J IS SINGULAR":GOTO 800
440         IN(1,1)=(1/D)$J(2,2) ‘calculate inverse of Jacobian
450         IN(1,2)=(1/D)$J(1,2)
460 IN(2,1)=-(1/D)*J(2,1)
470         IN(2,2)-(1/D)$J(1,1)
```

TABLE 3-continued

```
480       XG=XG+(IN(1,1)$(RR(1)-RRG(1))+IN(1,2)$(RR(2)-RRG(2))) 'next guesses of
490       YG=VG+(IN(2,1)$(RR(1)-RRG(1))+IN(2,2)$(RR(2)-RRG(2))) 'next location
500       FOR A=1 TO 2
510            RRG(A)=SQR((XG-X(0))^2+(YG-Y(0))^2)+SQR((XG-X(A))^2+(YG-Y(A))^2)
520            NEXT
530       PRINT XG,YG
540       WEND
550  LAT=LAA(0)+VG/60
560  LOT=LOO(0)-XG/(60$COS(LAA(O)$3.14159/180))
570  LAT=FNDMSI(LAT) 'convert beck to lat-long
580  LOT=FNDMSI(LOT)
590  PRINT"NEW LOC IS"LAT,"LAT,"LOT"LONG"
600  LPRINT"NEW LOC IS"LAT"LAT,"LOT"LONG"
610  PRINT"AVERAGE SPEED IS"3600$SQR((X(3)-XG)^2+(Y(3)-YG)^2)/T"KNOTS"
620  LPRINT"AVERAGE SPEED IS"3600*SQR((X(3)-XG,^2+(Y(3)-YG)^2)/T"KNOTS"
625  IF XG-X(3)=0 THEN Z=1
630  IF Z=1 THEN IF YG-Y(3) >0 THEN HE=0 ELSE HE=180 ELSE
          HE=ATN((VG-V(3))/(XG-X(3)))$180/3.14159
640  IF XG-X(3) >0 THEN HE=90-HE
650  IF XG-X(3) <0 THEN HE=270-HE
660  PRINT"THE COURSE IS"HE"DEGREES"
670  LPRINT"THE COURSE IS"HE"DEGREES"
680  PRINT"DISTANCE TRAVELED IS"SQR(X(3)-XG)^2+(Y(3)-YG)^2)"NAUT. MILES
690  LPRINT"DISTANCE TRAVELED IS"SQR((X(3)-XG)^2+(Y(3)-YG)^2)"NAUT. MILES":LPRINT
700  INPUT"INPUT A NEW SET OF DOPPLERS (1=YES,0=NO)";N
710  LPRINT"INPUT A NEW SET OF DOPPLERS (1=YES,0=NO)"N
720  IF N=0 THEN GOTO 800
730  INPUT"NEXT DOPPLER FOR ILL. 1";DOP(1)
740  LPRINT"NEXT DOPPLER FOR ILL. 1:"DOP(1)
750  INPUT"NEXT DOPPLER FOR ILL. 2";DOP(2)
760  LPRINT"NEXT DOPPLER FOR ILL. 2:"DOP(2)
761  INPUT"INPUT NEW INITIAL LOC (1=YES,0=N0)";G
762  IF G=1 THEN GOTO 149
770  LA(3)=LAT:LO(3)=LOT
780  COUNT=0
790  GOTO 170
800  STOP
```

The initial target location is identified in terms of the latitude and longitude. The target location may be obtained in a number of ways. For example, the target position might be initially known for some reason. In a test of the present invention, Doppler data was collected on Northwest flight 90 after a takeoff run north along the Potomac River from Washington National Airport. The initial target location was: latitude 38°,51'50" and longitude 77°.02'20"; just beyond the end of the north runway. The Doppler track data generated is presented below in the form of Table 4.

TABLE 4

```
KK-29-1983
LOC OF RECEIVER IN LAT.LONG(dd.mmss) 39.09                        77.13
LOC OF ILLUMINATOR 1 IN LAT,LONG(dd.mmss) 40.1545                 74.2753
LOC OF ILLUMINATOR 2 IN LAT,LONG (dd.mmss) 38.2415                75.3445
INPUT CARRIER F AND ASSOCIATED DELTA F FOR ILLU. 1 4.778+08       235
INPUT CARRIER F AND ASSOCIATED DELTA F FOR ILLU. 2 4.526+08       23
INPUT TIME FROM LAST MEASUREMENT (IN SECONDS) 10
INITIAL LOC OF TARGET IN LAT,LONG(dd.mmss) 38.515                 77.022
NEW LOC IS 38.5214 LAT. 77.0239 LONG
AVERATE SPEED IS 173.4565 KNOTS
THE COURSE IS 328.4937 DEGREES
DISTANCE TRAVELED IS .4823792 NAUT. MILES
INPUT A NEW SET OF DOPPLERS (1=YES,0=NO) 1
NEXT DOPPLER FOR ILL. 1: 233
NEXT DOPPLER FOR ILL. 2: 27
NEW LOC IS 38.5238 LAT. 77.0236 LONG
AVERAGE SPEED IS 175.866 KNOTS
THE COURSE IS 328.5874 DEGREES
DISTANCE TRAVELED IS .4829611 NAUT. MILES
INPUT A NEW SET OF DOPPLERS (1=YES,0=NO) 1
NEXT DOPPLER FOR ILL. 1: 233
NEXT DOPPLER FOR ILL. 2: 18
NEW LOC IS 38.3302 LAT. 77.0321 LONG
AVERAGE SPEED IS 185.0642 KNOTS
THE COURSE IS 323.1027 DEGREES
DISTANCE TRAVELED IS .5140672 NAUT. MILES
INPUT A NEW SET OF DOPPLERS (1=YES,0=NO) 1
NEXT DOPPLER FOR ILL. 1: 230
```

TABLE 4-continued

```
NEXT DOPPLER FOR ILL. 2: 0
NEW LOC IS 38.5335 LAT. 77.0332 LONG
AVERAGE SPEED IS 206.9362 KNOTS
THE COURSE IS 314.0168 DEGREES
DISTANCE TRAVELED IS .5748227 NAUT. MILES
INPUT A NEW SET OF DOPPLERS (1=YES,0=NO) 1
NEXT DOPPLER FOR ILL. 1: 220
NEXT DOPPLER FOR ILL. 2: -12
NEW LOC IS 30.3347 LAT. 77.0428 LONG
AVERAGE SPEED IS 216.6511 KNOTS
THE COURSE IS 309.2495 DEGREES
DISTANCE TRAVELED IS .6019065 NAUT. MILES
INPUT A NEW SET OF DOPPLERS (1=YES,0=NO) 1
NEXT DOPPLER FOR ILL. 1: 220
NEXT DOPPLER FOR ILL. 2: -12
NEW LOC IS 38.541 LAT. 77.0503 LONG
AVERAGE SPEED IS 217.0049 KNOTS
THE COURSE IS 309.8834 DEGREES
DISTANCE TRAVELED IS .6027913 NAUT. MILES
INPUT A NEW SET OF DOPPLERS (1=YES,0=NO) 1
NEXT DOPPLER FOR ILL. 1: 230
NEXT DOPPLER FOR ILL. 2: -10
NEW LOC IS 38.5434 LAT. 77.0538 LONG
AVERAGE SPEED IS 222.126 KNOTS
THE COURSE IS 311.4585 DEGREES
DISTANCE TRAVELED IS .6170167 NAUT. MILES
INPUT A NEW SET OF DOPPLERS (1=YES,0=NO) 1
NEXT DOPPLER FOR ILL. 1: 238
NEXT DOPPLER FOR ILL. 2: -6
NEW LOC IS 38.5501 LAT. 77.0612 LONG
AVERAGE SPEED IS 221.7166 KNOTS
THE COURSE IS 313.6958 DEGREES
DISTANCE TRAVELED IS .6158795 NAUT. MILES
INPUT A NEW SET OF DOPPLERS (1=YES,0=NO) 1
NEXT DOPPLER FOR ILL. 1: 240
NEXT DOPPLER FOR ILL. 2: 0
NEW LOC IS 38.5527 LAT. 77.0643 LONG
AVERAGE SPEED IS 215.3022 KNOTS
THE COURSE IS 316.6644 DEGREES
DISTANCE TRAVELED IS .5980615 NAUT. MILES
INPUT A NEW SET OF DOPPLERS (1=YES,0=NO) 1
NEXT DOPPLER FOR ILL. 1: 245
NEXT DOPPLER FOR ILL. 2: 1
NEW LOC IS 38.5554 LAT. 77.0714 LONG
AVERAGE SPEED IS 219.2406 KNOTS
THE COURSE IS 317.6068 DEGREES
DISTANCE TRAVELED IS .6090018 NAUT. MILES
INPUT A NEW SET OF DOPPLERS (1=YES,0=NO) 1
NEXT DOPPLER FOR ILL. 1: 245
NEXT DOPPLER FOR ILL. 2: 3
NEW LOC IS 38.5621 LAT. 77.0744 LONG
AVERAGE SPEED IS 215.5667 KNOTS
THE COURSE IS 318.9585 DEGREES
DISTANCE TRAVELED IS .5987964 NAUT. MILES
INPUT A NEW SET OF DOPPLERS (1=YES,0=NO) 1
NEXT DOPPLER FOR ILL. 1: 245
NEXT DOPPLER FOR ILL. 2: 3
NEW LOC IS 38.5648 LAT. 77.08141 LONG
AVERAGE SPEED IS 215.156 KNOTS
THE COURSE IS 319.5273 DEGREES
DISTANCE TRAVELED IS .5976001 NAUT. MILES
INPUT A NEW SET OF DOPPLERS (1=YES,0=NO) 1
NEXT DOPPLER FOR ILL. 1: 248
NEXT DOPPLER FOR ILL. 2: 0
NEW LOC IS 38.5715 LAT. 77.0845 LONG
AVERAGE SPEED IS 222.2685 KNOTS
THE COURSE IS 319.0021 DEGREES
DISTANCE TRAVELED IS .6174126 NAUT. MILES
INPUT A NEW SET OF DOPPLERS (1=YES,0=NO) 1
NEXT DOPPLER FOR ILL. 1: 252
NEXT DOPPLER FOR ILL. 2: -3
NEW LOC IS 38.5745 LAT. 77.0917 LONG
AVERAGE SPEED IS 229.2261 KNOTS
THE COURSE IS 318.6627 DEGREES
DISTANCE TRAVELED IS .6367392 NAUT. MILES
```

The algorithm of Table 3 used by the coop signal processing system 120 of FIG. 1 is written in BASIC. This algorithm converts all latitude and longitude values to an x-y grid, and correlates the Doppler shifted signals from the two illuminators to an expression of distance in wavelengths which, in turn, can be expressed in more convenient units such as nautical miles or kilometers.

Conversion is a difficult process because the functional relationship between Doppler frequencies and geographic coordinates is very nonlinear. Therefore, to determine velocity and position coordinates from Doppler frequencies, an iterative approach must be used. Secondly, the functional relationship is not single valued, that is, for a given association of doppler frequencies, more than one set of position and velocity component can exist. Third, since relatively large changes in position coordinates generally produce relatively small changes in Doppler frequencies, position components computed from measured Doppler frequencies are very sensitive to the inherent uncertainty of those measurements. Relatively large position errors can result from relatively small errors in Doppler frequency measurements. Methods of solving for position and velocity components are below.

Figure 4:
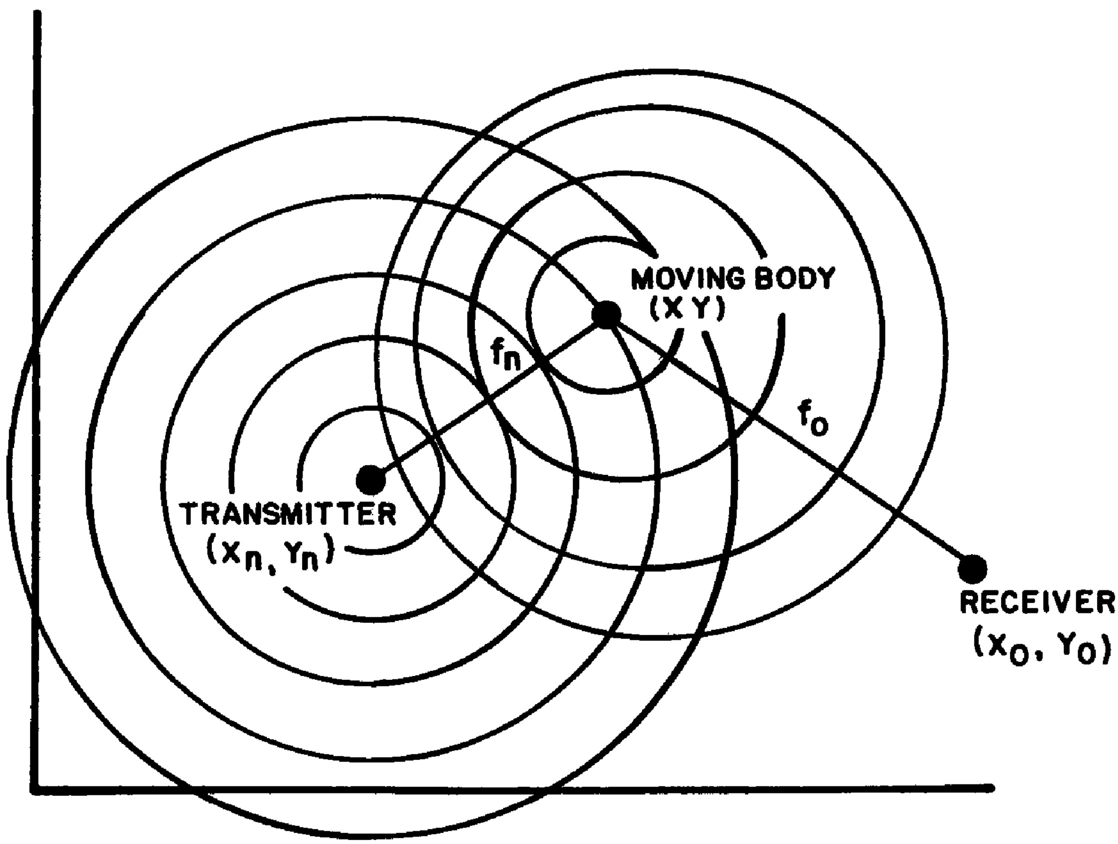
FIG. 4 is an illustration of the geographic coordinate system.

FIG. 4 is an illustration of the geographic coordinate system used. Before proceeding further, it is necessary to derive the equations that relate the position and velocity coordinates of a body to the Doppler frequency shift of electromagnetic radiation reflected from that body. The following definitions will be used:

c is the velocity of electromagnetic propagation in the atmosphere ($2.998\times10^8$ meters/sec or $5.8726\times10^8$ knots/sec)

$f_n$ is the carrier frequency of the $n^{th}$ transmitter measured in Hertz $f'_n$ is the carrier frequency of the $n^{th}$ transmitter seen by a moving body measured in Hertz $f''_n$ is the carrier frequency of the $n^{th}$ transmitter reflected from a moving body as seen by the receiver $d_n$ is the carrier frequency $n^{th}$ transmitter as seen at the receiver, and is equal to $(f_n-f''_n)/f_n$ $r_n$ is the shortest distance from the $n^{th}$ transmitter to the moving body (n=1,2 k) or from the receiver to the moving body n=0), measured in nautical miles (nm)

$r_n$ is $dr_n/dt$ measured in knots x,y are the instantaneous position coordinates of the moving body along orthogonal geographic axes, measured in nm u,v are the instantaneous velocity components of the moving body along orthogonal geographical axes, measured knots (u=dx/dt,v=dy/dt)

$x_n,Y_n$ are the position coordinates of the $n^{th}$ transmitter n=1,2, . . . k) or the receiver (n=0), measured in nm $x'_i,Y_i,u'_i$ are the $i^{th}$ estimate of the position and velocity components of the moving body, measured in nm and knots, respectively Using the receiver and the $n^{th}$ transmitter, the relativistic Doppler formula is $$f''_n \approx f'_n(l-r_o/(l-c^2/r^{2l/2}$$

and $$f'_n=f'_n(l-r_n/(l-c^2/r^{2l/2}$$

Because $\acute{r}_n$ and $\acute{r}_o$ are much less than c, terms of magnitude $r^2/c^2$ or smaller will be ignored. Therefore:

$$f'_n=f_n(l-\acute{r}_o/(c-\acute{r}_n/c)$$

and the normalized Doppler frequency is:

$$d_n=l.f''_n/f_n(\acute{r}_o+\acute{r}_n)/C$$

In terms of transmitter and receiver coordinates, $$r_n=[(x-x_n)2+(y-y_a)2]½$$

$$r_n=[(x-x_n)u+(y-Y_n)v]/r_n=P_n{}^u+q_n{}^v$$

Note that for a given x an y, $d_n$ is a linear function of u and v, since $P_n$ and $q_n$ are functions of $x_n$, $Y_n$, x, and y only. This relationship will prove useful in simplifying the association process.

The algorithm of Table 3 presumes a set of two Doppler-shifted signals from two illuminators of opportunity, although a pair of cooperative transmitters could also be used as illuminators. The receiving system is time multiplexed between the two signals. With two sets of Doppler measurements, this algorithm solves for two unknowns by solving simultaneous equations. Given the location (in latitude and longitude) of the two selected illuminators, their frequencies and the last known location of the target and an estimate of the target speed. The Doppler shift on signals reflected from the target can be predicted from this queing information.

The detected signals are then examined for the existence of signals in the anticipated frequency regions.

When the illumination source and the receiver are defined as the foci of an infinite set of elliposoids, and the target position is known, the range from illuminator to target to receiver is constant for a single element of the set of ellpsoids, (i.e., the sum of the ranges is constant for all points on the elliposoid.) When the geometry is large (e.g., 50 miles between illuminator, target and receiver), the ellipsoid can be approximated in two dimensions as an ellipse (i.e., the intersection of the ellipsoid with x,y plane is and eclipse. The Doppler shift produced by the vehicle motion can be expressed as distance in wavelengths and converted to convenient units such as kilometers, nautical miles etc., per unit of time. The distance derived above is a change in the sum of the ranges of illuminator to target and target to receiver. A change in the range sum implies target motion to another ellipse of constant range sums. When two illuminators are employed, the distance and direction of the target vehicle motion can be derived and a new position recorded at the end of the time interval that the Doppler measurements were made. The change in distance over the time interval provides the vehicle ground speed. The Dopplers in the above example were taken every 10 seconds to generate the target's flight path, but the process of the present invention may select any one of a variety of intervals to determine the location, speed and heading of a target from measured Doppler history.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A passive tracking system which tracks a target of known initial position from Doppler-shifted target signals, said passive differential tracking system comprising:

a first and second illuminator of opportunity, each being an, independent electromagnetic signal transmitter, said first illuminator of opportunity transmitting a first signal which is reflected off said target to produce a first Doppler-shifted target return signal, and said second illuminator of opportunity transmitting a second signal which is reflected off of said target to produce a second Doppler-shifted target return signal wherein said first and second illuminators are selected from a group consisting of: UHF TV stations; Low VHF TV stations; and High VHF TV stations;

an antenna which receives and conducts said first and second Doppler-shifted target return signals from said target;

a receiver which produces a first and second digital output signal by receiving and respectively converting into digital said first and second Doppler-shifted return target signals from said antenna, and wherein said antenna and said receiver have frequency ranges selected from a group consisting of: 50–90 MHz for low band; 164–230 MHz for mid band; and 470–890 MHz for high band, and wherein said antenna includes antennas having a horizontal polarization with a minimum pain which ranges between 10 dB and 18 dB, said antenna having an azimuth beamwidth of between 30 and 40 degrees and an elevation beamwidth of between 20 and 90 degrees;

an initial position determining means for measuring the initial position of said target; and a means for signal processing which receives said first and second digital output signals from said receiver, and combines said signals with said initial position of said target, said signal processing system thereby tracking said target by updating said target's changing in position with respect to said initial position; wherein said means for signal processing comprises a data processor which is programmed in BASIC with a two illuminator narrowband tracking program which enables said data processor to track said target by updating said target's location and said first and second illuminator of opportunity's location as well as Doppler and picture carrier frequency values for said first and second signal, said two illuminator narrowband tracking program comprising:

```
1 TWO ILLUMINATOR NARROW-BAND TRACKING PROGRAM
2 This program performs the 2 illuminator narrow-band tracking algorithm This program can artificially error the input dopplers in a Gaussian fashion
9 ' FNDMS and FNDMSI convert points on an x-y grid to lat-long and back again.
10 DEF FNDMS(X)=INT(X)+(INT(X*100+1/120)–INT(X)*100)/60+(X*10000–INT(X*100+1/120)*100)/3600
20 DEF FNDMSI(X)=SGN(X)*(ABS(INT(X)+ABS(INT((X–INT(X))*60+1/70)/100)+ABS(INT((X*60–INT(X*60–1/70))*60+1/70)/10000))
21 N=VAL(RIGHT$(TIME$,2)
22 RANDOMIZE N
25 LPRINT CHR$(27)+CHR$(69):LPRINT DATE$:LPRINT
30 INPUT"LOC OF RECEIVER IN LAT,LONG (dd.mmss)";LA(0),LO(0)
40 LPRINT"LOC OF RECEIVER IN LAT,LONG (dd.mmss)"LA(0),LO(0)
50 INPUT"LOC OF ILLUMINATOR 1 IN LAT, LONG(dd.mmss)";LA(1),LO(1)
60 LPRINT"LOC OF ILLUMINATOR 1 IN LAT, LONG(dd.mmss)"LA(1),LO(1)
70 INPUT"LOC OF ILLUMINATOR 2 IN LAT, LONG(dd.mmss)";LA(2),LO(2)
80 LPRINT"LOC OF ILLUMINATOR 2 IN LAT, LONG(dd.mmss)"LA(2),LO(2)
90 INPUT"INPUT CARRIER F AND ASSOCIATED DELTA F FOR ILLU. 1";CAR(1),DOP(1)
100 LPRINT"INPUT CARRIER F AND ASSOCIATED DELTA F FOR ILLU. 1"CAR(1),DOP(1)
110 INPUT"INPUT CARRIER F AND ASSOCIATED DELTA F FOR ILLU. 2";CAR(2),DOP(2)
120 LPRINT"INPUT CARRIER F AND ASSOCIATED DELTA F FOR ILLU. 2"CAR(2),DOP(2)
130 INPUT"INPUT TIME FROM LAST MEASUREMENT (IN SECONDS)";T
140 LPRINT"INPUT TIME FROM LAST MEASUREMENT (IN SECONDS)"T
149 COUNT=0
150 INPUT"INITIAL LOC OF TARGET IN LAT, LONG(dd.mmss)";LA(3),LO(3)
160 LPRINT"INITIAL LOC OF TARGET IN LAT, LONG(dd.mmss)"LA(3),LO(3)
170 FOR I=1 TO 2
171 XX=0
172 FOR J=1 TO 20:XX=XX+RND:NEXT
173 XX=(XX–10)*.7745967
174 DOP(I)=DOP(I)+DOP(I)*.002*XX
175 PRINT DOP(I)
176 NEXT
177 FOR A=0 TO 3 'convert lat-long values to an x-y grid
180 LAA(A)=FNDMS(LA(A))
190 LOO(A)=FNDMS(LO(A))
200 X(A)=60* (LOO(0)–LOO(A))*COS(LAA(0)*3.14159/180)
210 Y(A)=60* (LAA(A)–LAA(0))
220 NEXT
230 FOR A=1 TO 2 'calculate range sum difference
240 RSD(A)=–(162000!)*DOP(A)*T/CAR(A)
250 NEXT
260 XG=X(3):YG=Y(3)
270 FOR A=1 TO 2 'calculate values of simultaneous equations
280 RR(A)=RSD(A)+SQR((XG–X(0))^2+(YG–Y(0))^2)+SQR((XG–X(A))^2+(YG–Y(A))^2)
290 RRG(A)=RR(A)–RSD(A)
300 NEXT
310 WHILE SQR((RR(1)–RRG(1))^2+(RR(2)–RRG(2))^2)>.001 'window of convergence
320 COUNT=COUNT+1
330 IF COUNT=50 THEN PRINT"DIVERGENCE-":GOTO 800
340 FOR A=0 TO 2 'calculate values of Jacobian
350 DRDX(A)=((XG–X(A))^2+(YG–Y(A))^2)(–.5)*(XG–X(A))
360 DRDY(A)=((XG–X(A))^2+(YG–Y(A))^2)(–.5)*(YG–Y(A))
370 NEXT
380 J(1,1)=DRDX(0)+DRDX(1)
390 J(1,2)=DRDY(0)+DRDY(1)
400 J(2,1)=DRDX(0)+DRDX(2)
410 J(2,2)=DRDY(0)+DRDY(2)
420 D=J(1,1)*J(2,2)–J(1,2)*J(2,1) 'determinant of Jacobian
430 IF D=0 THEN PRINT"J IS SINGULAR":GOTO 800
```

```
440 IN(1,1)=(1/D)*J(2,2) 'calculate inverse of Jacobian
450 IN(1,2,)=-(1/D)*J(1,2)
460 IN(2,1)=-(1/D)*J(2,1)
470 IN(2,2)=(1/D)*J(1,1)
480 XG=XG+(IN(1,1)*(RR(1)-RRG(1))+IN(1,2)*(RR(2)-RRG(2))) 'next guesses of
490 YG=YG+(IN(2,1)*(RR(1)-RRG(1))+IN(2,2)*(RR(2)-RRG(2))) 'new location
500 FOR A=1 TO 2
510 RRG(A)=SQR(XG-X(0))^2+(YG-Y(0))^2)+SQR((XG-X(A))^2+(YG-Y(A))^2)
520 NEXT
530 PRINT XG,YG
540 WEND
550 LAT=LAA(0)+YG/60
560 LOT=LOO(0)-XG/(60*COS(LAA(0)*3.14159/180))
570 LAT=FNDMSI(LAT) 'convert back to lat-long
580 LOT=FNDMSI (LOT)
590 PRINT"NEW LOC IS"LAT"LAT, "LOT"LONG"
600 LPRINT"NEW LOC IS"LAT"LAT, "LOT"LONG"
610 PRINT"AVERAGE SPEED IS"3600*SQR((X(3)-XG)^2+(Y(3)-YG)^2)/T"KNOTS"
620 LPRINT"AVERAGE SPEED IS"3600*SQR((X(3)-XG)^2+(Y(3)-YG)^2)/T"KNOTS"
625 IF XG-X(3)=0 THEN Z=1
630 IF Z=1 THEN IF YG-Y(3)>0 THEN HE=0 ELSE HE=180 ELSE HE=ATN((YG-Y(3))/(XG-X(3)))*180/3.14139
640 IF XG-X(3)>0 THEN HE=90-HE
650 IF XG-X(3)<0 THEN HE=270-HE
660 PRINT"THE COURSE IS"HE"DEGREES"
670 LPRINT"THE COURSE IS"HE"DEGREES"
680 PRINT"DISTANCE TRAVELED IS"SQR((X(3)-XG)^2+(Y(3)-YG)^2)"NAUT. MILES
690 LPRINT"DISTANCE TRAVELED IS"SQR((X(3)-XG)^2+(Y(3)-YG)^2)"NAUT. MILES":L-PRINT
700 INPUT"INPUT A NEW SET OF DOPPLERS (1=YES, 0=NO)";N
710 LPRINT"INPUT A NEW SET OF DOPPLERS (1=YES, 0=NO)"N
720 IF N=0 THEN GOTO 800
730 INPUT"NEXT DOPPLER FOR ILL. 1";DOP(1)
740 LPRINT"NEXT DOPPLER FOR ILL. 1:"DOP(1)
750 INPUT"NEXT DOPPLER FOR ILL. 2";DOP(2)
760 LPRINT"NEXT DOPPLER FOR ILL. 2: "DOP(2)
761 INPUT"INPUT NEW INITIAL LOC (1=YES, 0=NO)";G
762 IF G=1 THEN GOTO 149
770 LA(3)=LAT:LO(3)=LOT
780 COUNT=0
790 GOTO 170
800 STOP.
```

2. A process of passively tracking a moving target over long ranges without emitting illumination signals, said process comprising the steps of:

selecting two independent electromagnetic signal transmitters to serve as first and second illuminators of opportunity which independently and autonomously transmit respectively first and second signals which respectively become first and second Doppler-shifted target return signals as they reflect off said moving target;

independently ascertaining said moving-target's initial location;

receiving said first and second Doppler-shifted target return signals; and computing said moving target's position, velocity and course with a tracking program which correlates Doppler shifting in said first and second Doppler-shifted target return signals with an update of said moving target's position, velocity, course and distance traveled, wherein said tracking program in said computing step comprises:

```
1 TWO ILLUMINATOR NARROW-BAND TRACKING PROGRAM
2 This program performs the 2 illuminator narrow-band tracking algorithm This program can artificially error the input dopplers in a Gaussian fashion
9 ' FNDMS and FNDMSI convert points on an x-y grid to lat-long and back again.
10 DEF FNDMS(X)=INT(X)+(INT(X*100+1/120)-INT(X)*100)/60+(X*10000-INT(X*100+1/120)*100)/3600
20 DEF FNDMSI(X)=SGN(X)*(ABS(INT(X)+ABS(INT((X-INT(X))*60+1/70)/100)+ABS(INT((X*60-INT(X*60-1/70))*60+1/70)/10000))
21 N=VAL(RIGHT$(TIME$,2)
22 RANDOMIZE N
25 LPRINT CHR$(27)+CHR$(69):LPRINT DATE$:LPRINT
30 INPUT"LOC OF RECEIVER IN LAT,LONG (dd.mmss)";LA(0),LO(0)
40 LPRINT"LOC OF RECEIVER IN LAT,LONG (dd.mmss)"LA(0),LO(0)
50 INPUT"LOC OF ILLUMINATOR 1 IN LAT,LONG(dd.mmss)";LA(1),LO(1)
60 LPRINT"LOC OF ILLUMINATOR 1 IN LAT,LONG(dd.mmss)"LA(1),LO(1)
70 INPUT"LOC OF ILLUMINATOR 2 IN LAT,LONG(dd.mmss)";LA(2),LO(2)
80 LPRINT"LOC OF ILLUMINATOR 2 IN LAT,LONG(dd.mmss)"LA(2),LO(2)
90 INPUT"INPUT CARRIER F AND ASSOCIATED DELTA F FOR ILLU. 1";CAR(1),DOP(1)
100 LPRINT"INPUT CARRIER F AND ASSOCIATED DELTA F FOR ILLU. 1"CAR(1),DOP(1)
110 INPUT"INPUT CARRIER F AND ASSOCIATED DELTA F FOR ILLU. 2";CAR(2),DOP(2)
120 LPRINT"INPUT CARRIER F AND ASSOCIATED DELTA F FOR ILLU. 2"CAR(2),DOP(2)
130 INPUT"INPUT TIME FROM LAST MEASUREMENT (IN SECONDS)";T
140 LPRINT"INPUT TIME FROM LAST MEASUREMENT (IN SECONDS)"T
149 COUNT=0
150 INPUT"INITIAL LOC OF TARGET IN LAT,LONG(dd.mmss)";LA(3),LO(3)
160 LPRINT"INITIAL LOC OF TARGET IN LAT,LONG(dd.mmss)"LA(3),LO(3)
170 FOR I=1 TO 2
171 XX=0
172 FOR J=1 TO 20:XX=XX+RND:NEXT
173 XX=(XX-10)*.7745967
174 DOP(I)=DOP(I)+DOP(I)*.002*XX
175 PRINT DOP(I)
176 NEXT
177 FOR A=0 TO 3 'convert lat-long values to an x-y grid
180 LAA(A)=FNDMS(LA(A))
190 LOO(A)=FNDMS(LO(A))
200 X(A)=60* (LOO(0)-LOO(A))*COS(LAA(0)*3.14159/180)
```

```
210 Y(A)=60* (LAA(A)−LAA(0))
220 NEXT
230 FOR A=1 TO 2 'calculate range sum difference
240 RSD(A)=−(162000!)*DOP(A)*T/CAR(A)
250 NEXT
260 XG=X(3):YG=Y(3)
270 FOR A=1 TO 2 'calculate values of simultaneous equations
280 RR(A)=RSD(A)+SQR((XG−X(0))^2+(YG−Y(0))^2)+SQR((XG−X(A))^2+(YG−Y(A))^2)
290 RRG(A)=RR(A)−RSD(A)
300 NEXT
310 WHILE SQR((RR(1)−RRG(1))^2+(RR(2)−RRG(2))^2)>.001 'window of convergence
320 COUNT=COUNT+1
330 IF COUNT=50 THEN PRINT"DIVERGENCE-":GOTO 800
340 FOR A=0 TO 2 'calculate values of Jacobian
350 DRDX(A)=((XG−X(A))^2+(YG−Y(A))^2)(−.5)*(XG−X(A))
360 DRDY(A)=((XG−X(A))^2+(YG−Y(A))^2)(−.5)*(YG−Y(A))
370 NEXT
380 J(1,1)=DRDX(0)+DRDX(1)
390 J(1,2)=DRDY(0)+DRDY(1)
400 J(2,1)=DRDX(0)+DRDX(2)
410 J(2,2)=DRDY(0)+DRDY(2)
420 D=J(1,1)*J(2,2)−J(1,2)*J(2,1) 'determinant of Jacobian
430 IF D=0 THEN PRINT"J IS SINGULAR":GOTO 800
440 IN(1,1)=(1/D)*J(2,2) 'calculate inverse of Jacobian
450 IN(1,2,)=−(1/D)*J(1,2)
460 IN(2,1)=−(1/D)*J(2,1)
470 IN(2,2)=(1/D)*J(1,1)
480 XG=XG+(IN(1,1)*(RR(1)−RRG(1))+IN(1,2)*(RR(2)−RRG(2))) 'next guesses of
490 YG=YG+(IN(2,1)*(RR(1)−RRG(1))+IN(2,2)*(RR(2)−RRG(2))) 'new location
500 FOR A=1 TO 2
510 RRG(A)=SQR(XG−X(0))^2+(YG−Y(0))^2)+SQR((XG−X(A))^2+(YG−Y(A))^2)
520 NEXT
530 PRINT XG,YG
540 WEND
550 LAT=LAA(0)+YG/60
560 LOT=LOO(0)−XG/(60*COS(LAA(0)*3.14159/180))
570 LAT=FNDMSI(LAT) 'convert back to lat-long
580 LOT=FNDMSI (LOT)
590 PRINT"NEW LOC IS"LAT"LAT, "LOT"LONG"
600 LPRINT"NEW LOC IS"LAT"LAT, "LOT-"LONG"
610 PRINT"AVERAGE SPEED IS"3600*SQR((X(3)−XG)^2+(Y(3)−YG)^2)/T"KNOTS"
620 LPRINT"AVERAGE SPEED IS"3600*SQR((X(3)−XG)^2+(Y(3)−YG)^2)/T"KNOTS"
625 IF XG−X(3)=0 THEN Z=1
630 IF Z=1 THEN IF YG−Y(3)>0 THEN HE=0 ELSE HE=180 ELSE HE=ATN((YG−Y(3))/(XG−X(3)))*180/3.14139
640 IF XG−X(3)>0 THEN HE=90−HE
650 IF XG−X(3)<0 THEN HE=270−HE
660 PRINT"THE COURSE IS"HE"DEGREES"
670 LPRINT"THE COURSE IS"HE"DEGREES"
680 PRINT"DISTANCE TRAVELED IS"SQR((X(3)−XG)^2+(Y(3)−YG)^2)"NAUT. MILES
690 LPRINT"DISTANCE TRAVELED IS"SQR((X(3)−XG)^2+(Y(3)−YG)^2)"NAUT. MILES":L-PRINT
700 INPUT"INPUT A NEW SET OF DOPPLERS (1=YES, 0=NO)";N
710 LPRINT"INPUT A NEW SET OF DOPPLERS (1=YES, 0=NO)"N
720 IF N=0 THEN GOTO 800
730 INPUT"NEXT DOPPLER FOR ILL. 1";DOP(1)
740 LPRINT"NEXT DOPPLER FOR ILL. 1:"DOP(1)
750 INPUT"NEXT DOPPLER FOR ILL. 2";DOP(2)
760 LPRINT"NEXT DOPPLER FOR ILL. 2: "DOP(2)
761 INPUT"INPUT NEW INITIAL LOC (1=YES, 0=NO)";G
762 IF G=1 THEN GOTO 149
770 LA(3)=LAT:LO(3)=LOT
780 COUNT=0
790 GOTO 170
800 STOP.
```

3. A process, as defined in claim 2, wherein said selecting step comprises a selection of the picture carrier signal of two separate television transmitting stations to serve as said first and second illuminator of opportunity, said two separate television stations having geographic locations in proximity with said moving target.

4. A passive radar tracking system which uses reflections of radio frequency television station signals from an aircraft to track said aircraft, wherein said passive radar tracking system comprises:

two television stations which serve as a first and second illuminator which respectively transmit a first and a second signal which are reflected off of said aircraft to respectively produce a first and a second Doppler-shifted target return signal;

an antenna which receives and conducts said first and second Doppler-shifted target return signals;

a receiver which is electrically connected with said antenna, and which produces a first and second digital output signal by receiving and converting into digital signals the first and second target return signals which said receiver gets from said antenna; and a means for signal processing which is electrically connected with said receiver to receive said first and second digital output signals therefrom, and said signal processing means calculating said aircraft's longitude, latitude, course and distance to track said aircraft thereby.

5. A passive radar tracking system, as defined in claim 4, wherein said two television stations are selected from a group consisting of: UHF TV stations, Low VHF TV stations, and high VHF TV stations.

* * * * *